(12) United States Patent
Lee et al.

(10) Patent No.: US 12,061,765 B1
(45) Date of Patent: Aug. 13, 2024

(54) TOUCHPAD MODULE

(71) Applicant: Primax Electronics Ltd., Taipei (TW)

(72) Inventors: Chao-Wei Lee, Taipei (TW); Hsueh-Chao Chang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/135,647

(22) Filed: Apr. 17, 2023

(30) Foreign Application Priority Data

Mar. 22, 2023 (TW) .................................. 112110582

(51) Int. Cl.
*G06F 3/041* (2006.01)
*G06F 3/047* (2006.01)

(52) U.S. Cl.
CPC ..................................... *G06F 3/047* (2013.01)

(58) Field of Classification Search
CPC .................................. G06F 3/047; G06F 3/041
See application file for complete search history.

(56) References Cited

U.S. PATENT DOCUMENTS

| | | | | |
|---|---|---|---|---|
| 6,188,391 B1* | 2/2001 | Seely | ..................... | G06F 3/0443 345/173 |
| 9,905,528 B2* | 2/2018 | Kira | ......................... | H01L 24/81 |
| 10,643,924 B1* | 5/2020 | Shen | ..................... | H01L 25/0655 |
| 11,489,025 B2* | 11/2022 | Kim | ......................... | H10K 50/84 |
| 2004/0240865 A1* | 12/2004 | Bergmann | .............. | H01L 24/26 392/407 |
| 2007/0243704 A1* | 10/2007 | Tai | ........................ | H05K 3/3452 438/612 |
| 2008/0158173 A1* | 7/2008 | Hamblin | ............... | G06F 1/1684 345/173 |
| 2009/0029537 A1* | 1/2009 | Hsu | ...................... | H01L 23/4334 438/584 |
| 2009/0061111 A1* | 3/2009 | Mishima | ................. | C23C 16/44 118/724 |
| 2010/0175347 A1* | 7/2010 | Bettger | ............... | E06B 3/66371 52/788.1 |
| 2014/0183591 A1* | 7/2014 | Jow | ........................ | H01L 27/156 438/26 |
| 2014/0362550 A1* | 12/2014 | Zhang | ............... | H01L 23/49811 361/767 |
| 2017/0075492 A1* | 3/2017 | Kim | ....................... | G06F 3/0418 |
| 2018/0079933 A1* | 3/2018 | Shimizu | .................... | B32B 3/30 |

(Continued)

*Primary Examiner* — Jose R Soto Lopez
(74) *Attorney, Agent, or Firm* — KIRTON McCONKIE; Evan R. Witt

(57) ABSTRACT

A touchpad module includes a touch member, a touch sensitive circuit board and an additional solder resist layer. The touch sensitive circuit board is located under the touch member. The touch sensitive circuit board includes a substrate, a sensing wire layer and a solder resist layer. The sensing wire layer is installed on the substrate. The sensing wire layer and a portion of the substrate are covered by the solder resist layer. At least one exhaust channel is formed in the solder resist layer. The additional solder resist layer is arranged between the touch member and the touch sensitive circuit board. At least one additional exhaust channel is formed in the additional solder resist layer and arranged between the touch member and the touch sensitive circuit board. The at least one additional exhaust channel is in communication with the at least one exhaust channel.

7 Claims, 3 Drawing Sheets

(56) References Cited

U.S. PATENT DOCUMENTS

| | | | | |
|---|---|---|---|---|
| 2018/0107298 A1* | 4/2018 | Zhang | ................... | G06F 3/0443 |
| 2018/0226289 A1* | 8/2018 | Bielefeld | .......... | H01L 21/76826 |
| 2019/0148248 A1* | 5/2019 | Basol | ................. | H01L 21/3065 |
| | | | | 438/13 |
| 2019/0279960 A1* | 9/2019 | Karhade | ................ | H01L 25/50 |
| 2019/0286257 A1* | 9/2019 | Choi | ................... | G06F 3/03547 |
| 2019/0387630 A1* | 12/2019 | Belman | ............... | H05K 3/3442 |
| 2020/0365447 A1* | 11/2020 | Mays | ............... | H01L 21/02263 |
| 2020/0395269 A1* | 12/2020 | Dubey | ................... | H01L 23/42 |
| 2020/0402884 A1* | 12/2020 | Wan | .................... | H01L 23/3675 |
| 2020/0411407 A1* | 12/2020 | Dubey | ................ | H01L 25/0652 |
| 2021/0074896 A1* | 3/2021 | Lin | ........................ | H01L 33/54 |
| 2021/0076491 A1* | 3/2021 | Kijima | ............. | H01L 23/49822 |
| 2021/0173498 A1* | 6/2021 | Zhang | .................... | G06F 3/041 |
| 2022/0068668 A1* | 3/2022 | Suzuki | ............. | H01L 21/02041 |
| 2022/0190278 A1* | 6/2022 | Jeong | ............ | H10K 59/80515 |
| 2022/0199449 A1* | 6/2022 | Baker | ................ | H01L 21/6833 |
| 2022/0201858 A1* | 6/2022 | Xiong | ................... | H05K 3/363 |
| 2022/0367334 A1* | 11/2022 | Huang | ............. | H01L 23/49838 |
| 2023/0089623 A1* | 3/2023 | Lacap | .................... | H01L 24/29 |
| | | | | 257/666 |
| 2023/0163209 A1* | 5/2023 | Prechtl | ................. | H01L 29/205 |
| | | | | 438/172 |
| 2023/0171874 A1* | 6/2023 | Eom | ................... | H05K 1/0209 |
| | | | | 174/252 |
| 2023/0209964 A1* | 6/2023 | Park | ....................... | H10K 59/40 |
| | | | | 345/173 |
| 2024/0155761 A1* | 5/2024 | Xiao | ....................... | H05K 1/14 |

* cited by examiner

TOUCHPAD MODULE

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices used in daily lives include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

For example, in case that the user's finger is placed on the touchpad and slid on the touchpad, a cursor shown on a display screen is correspondingly moved. Moreover, in case that the touchpad is pressed down by the user's finger, the electronic device executes a specified function. The use of the touchpad can implement some functions of the conventional mouse. In other words, the user may operate the electronic device through the touchpad without the need of additionally carrying or installing the mouse.

The structure of the touchpad module mainly includes a touch member and a touch sensitive circuit board. The touch sensitive circuit board is located under the touch member. The touch sensitive circuit board comprises a substrate, plural copper foil wire units and a solder resist layer. These copper foil wire units are discretely arranged on the substrate. The solder resist layer covers the plural copper foil wire units and a portion of the substrate. Consequently, an exhaust channel is defined between two adjacent copper foil wire units.

The process of fabricating the touchpad module comprises a step of attaching or assembled the touch member on the touch sensitive circuit board. While the touch member is attached or assembled on the touch sensitive circuit board, gas is usually generated in the space between the touch member and the touch sensitive circuit board. At this time, the gas is exhausted through the exhaust channels on the touch sensitive circuit board. Since the gas generated in the space between the touch member and the touch sensitive circuit board is exhausted, the tightness of the attachment or the assembly between the touch member and the touch sensitive circuit board can be increased.

In some situations, it is necessary to immediately exhaust the generated gas. For example, in case that the cross-section area of the exhaust channel is increased, the gas generated in the space between the touch member and the touch sensitive circuit board can be immediately exhausted while the touch member and the touch sensitive circuit board are attached or assembled on each other. Conventionally, in order to increase the cross-section area of the exhaust channel, the thickness of the copper foil wire unit is increased. Due to the increase of the thickness of the copper foil wire unit, the fabricating cost is increased. In addition, the width of the copper foil wire unit and the distance between the adjacent copper foil wire units are increased.

Therefore, there is a need of providing an improved touchpad module in order to overcome the above drawbacks.

SUMMARY OF THE INVENTION

An object of the present invention provides a touchpad module.

The other objects and advantages of the present invention will be understood from the disclosed technical features.

In accordance with an aspect of the present invention, a touchpad module is provided. The touchpad module includes a touch member, a touch sensitive circuit board and an additional solder resist layer. The touch sensitive circuit board is located under the touch member. The touch sensitive circuit board includes a substrate, a sensing wire layer and a solder resist layer. The sensing wire layer is installed on the substrate. The sensing wire layer and a portion of the substrate are covered by the solder resist layer. At least one exhaust channel is formed in the solder resist layer. The additional solder resist layer is arranged between the touch member and the touch sensitive circuit board. At least one additional exhaust channel is formed in the additional solder resist layer and arranged between the touch member and the touch sensitive circuit board. The at least one additional exhaust channel is in communication with the at least one exhaust channel.

In an embodiment, the sensing wire layer includes a first sensing wire unit and a second sensing wire unit. The first sensing wire unit, the second sensing wire unit and the portion of the substrate are covered by the solder resist layer. The at least one exhaust channel is formed in the solder resist layer and arranged between the first sensing wire unit and the second sensing wire unit.

In an embodiment, the additional solder resist layer includes a first solder resist part and a second solder resist part. The first solder resist part and the second solder resist part are respectively aligned with the first sensing wire unit and the second sensing wire unit. The solder resist layer of the touch sensitive circuit board is covered by the first solder resist part and the second solder resist part. The at least one additional exhaust channel is formed between the first solder resist part and the second solder resist part.

In an embodiment, each of the first solder resist part and the second solder resist part is a patterned structure, and the patterned structure comprises a gas channel. The gas channel is in communication with the at least one additional exhaust channel.

In an embodiment, the sensing wire layer includes a first sensing wire unit, a second sensing wire unit and a third sensing wire unit. The at least one exhaust channel includes plural exhaust channels. The second sensing wire unit is arranged between the first sensing wire unit and the third sensing wire unit. The plural exhaust channels includes a first exhaust channel and a second exhaust channel. The first sensing wire unit, the second sensing wire unit, the third sensing wire unit and the portion of the substrate are covered by the solder resist layer. The first exhaust channel is arranged between the first sensing wire unit and the second sensing wire unit. The second exhaust channel is arranged between the second sensing wire unit and the third sensing wire unit. The first exhaust channel and the second exhaust channel are in communication with the at least one additional exhaust channel.

In an embodiment, the additional solder resist layer includes a first solder resist part and a second solder resist part. The first solder resist part and the second solder resist part are respectively aligned with the first sensing wire unit and the third sensing wire unit. The solder resist layer of the touch sensitive circuit board is covered by the first solder resist part and the second solder resist part. The additional exhaust channel is formed between the first solder resist part and the second solder resist part.

In an embodiment, the touch member is a glass plate or a thin film.

From the above descriptions, the present invention provides the touchpad module. The touchpad module is equipped with the additional solder resist layer between the touch member and the touch sensitive circuit board. The additional exhaust channel formed in the additional solder resist layer and the exhaust channel formed in the touch sensitive circuit board are in communication with each other. Consequently, the space of the overall exhaust channel of the touchpad module is increased. Due to this structural design, the following benefits are achieved. For example, while the touch member is attached or assembled on the touch sensitive circuit board, the gas can be exhausted through the enlarged spaces of the exhaust channels between the touch member and the touch sensitive circuit board. Consequently, the tightness of the attachment or the assembly between the touch member and the touch sensitive circuit board is effectively enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
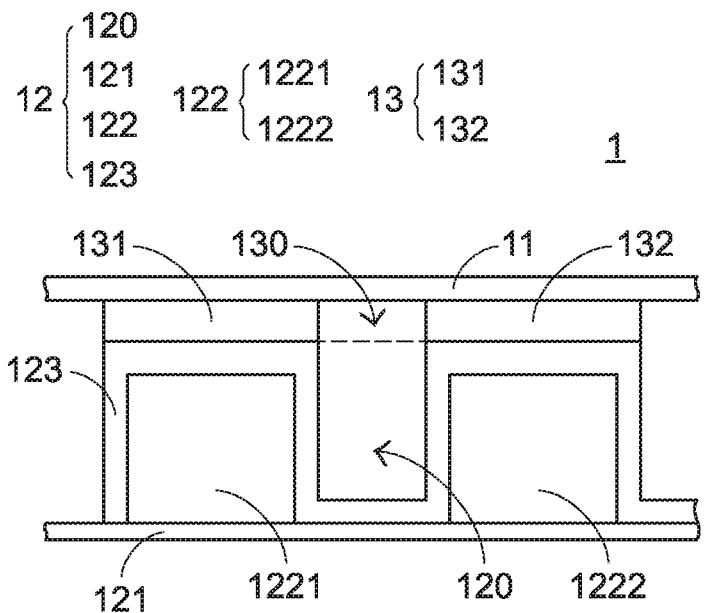
FIG. 1 is a schematic cross-sectional view illustrating a touchpad module according to a first embodiment of the present invention.

FIG. 1 is a schematic cross-sectional view illustrating a touchpad module according to a first embodiment of the present invention. As shown in FIG. 1, the touchpad module 1 is installed in a fixing frame (not shown) of a bottom housing of a notebook computer. The touchpad module 1 is electrically connected with a processor of the notebook computer. At least a portion of the touchpad module 1 is exposed outside so as to be touched by the user's finger. Consequently, the notebook computer can be operated by the user. When the user's finger is placed on the touchpad module 1 and slid on the touchpad module 1, a mouse cursor is correspondingly moved. Moreover, in case that the touchpad module 1 is pressed down by the user's finger, the notebook computer executes a specific function.

The other structure of the touchpad module 1 will be described in more details as follows.

As shown in FIG. 1, the touchpad module 1 comprises a touch member 11, a touch sensitive circuit board 12 and an additional solder resist layer 13.

The touch sensitive circuit board 12 is located under the touch member 11. In addition, the touch sensitive circuit board 12 comprises a substrate 121, a sensing wire layer 122 and a solder resist layer 123. The sensing wire layer 122 is installed on the substrate 121. The solder resist layer 123 covers the sensing wire layer 122 and a portion of the substrate 121. The sensing wire layer 122 comprise plural convex structures, which are discretely arranged on the substrate 121. In addition, one concave structure is arranged between two adjacent convex structures. Consequently, when the sensing wire layer 122 is installed on the substrate 121, plural convex structures and plural concave structures are alternately arranged on the substrate 121. Consequently, when the sensing wire layer 122 and the portion of the substrate 121 are covered by the solder resist layer 123, at least one exhaust channel 120 is formed in the solder resist layer 123 of the touch sensitive circuit board 12.

The additional solder resist layer 13 is arranged between the touch member 11 and the touch sensitive circuit board 12. In addition, at least one additional exhaust channel 130 is formed in the additional solder resist layer 13 and arranged between the touch member 11 and the touch sensitive circuit board 12. The at least one additional exhaust channel 130 formed in the additional solder resist layer 13 and at least one exhaust channel 120 formed in the solder resist layer 123 are in communication with each other.

Preferably but not exclusively, the touch member 11 is a glass plate or a thin film. The material of the touch member 11 may be varied according to the practical requirements.

As shown in FIG. 1, the sensing wire layer 122 comprises a first sensing wire unit 1221 and a second sensing wire unit 1222. The first sensing wire unit 1221, the second sensing wire unit 1222 and a portion of the substrate 121 are covered by the solder resist layer 123. Consequently, the exhaust channel 120 is formed in the solder resist layer 123 and arranged between the first sensing wire unit 1221 and the second sensing wire unit 1222.

As shown in FIG. 1, the additional solder resist layer 13 comprises a first solder resist part 131 and a second solder resist part 132. The first solder resist part 131 and the second solder resist part 132 are respectively aligned with the first sensing wire unit 1221 and the second sensing wire unit 1222. In addition, the solder resist layer 123 of the touch sensitive circuit board 12 is covered by the first solder resist part 131 and the second solder resist part 132. Consequently, the additional exhaust channel 130 is formed between the first solder resist part 131 and the second solder resist part 132.

As shown in FIG. 1, the first solder resist part 131 is directly located over a first portion of the solder resist layer 123 aligned with the first sensing wire unit 1221, and the second solder resist part 132 is directly located over a second portion of the solder resist layer 123 aligned with the second sensing wire unit 1222. When the additional solder resist layer 13 is formed to cover the solder resist layer 123 of the touch sensitive circuit board 12, the exhaust channel 120 of the touch sensitive circuit board 12 is exposed to the additional solder resist layer 13. In other words, the exhaust channel 120 is in communication with the additional exhaust channel 130 between the first solder resist part 131 and the second solder resist part 132.

In the above embodiment, the sensing wire layer 122 comprises two sensing wire units, and the additional solder resist layer 13 comprises two solder resist parts. In some other embodiments, the sensing wire layer 122 comprises more than two sensing wire units. After the solder resist layer 123 covers the sensing wire units and the portion of the substrate 121, one exhaust channel 120 is formed in the solder resist layer 123 and arranged between every two adjacent sensing wire units. In other words, the sensing wire layer 122 comprises plural exhaust channels 120. In case that the sensing wire layer 122 comprises more than two sensing wire units, the additional solder resist layer 13 comprises more than two solder resist parts. The number of the solder resist parts is equal to the number of the sensing wire units. In other words, the number of the additional exhaust channel 130 formed in the additional solder resist layer 13 is equal to the number of the exhaust channels 120.

In the above embodiment, the touchpad module 1 comprises a single additional solder resist layer 13. In some other embodiments, the touchpad module 1 comprises two, three or more than three additional solder resist layers 13, which are stacked on each other. That is, the number of the additional solder resist layers 13 may be varied according to the required space of the exhaust channel. Moreover, the thickness of the is not restricted. That is, the thickness of the additional solder resist layer 13 may be increased or decreased according to the required space of the exhaust channel.

As mentioned above, the touchpad module 1 is equipped with the additional solder resist layer 13 between the touch member 11 and the touch sensitive circuit board 12. That is, the additional solder resist layer 13 is formed on the solder resist layer 123 of the touch sensitive circuit board 12. Moreover, the additional exhaust channel 130 formed in the additional solder resist layer 13 and the exhaust channel 120 formed in the touch sensitive circuit board 12 are in communication with each other. Consequently, the space of the overall exhaust channel of the touchpad module 1 is increased. Due to this structural design, the following benefits are achieved. For example, while the touch member 11 is attached or assembled on the touch sensitive circuit board 12, the gas can be exhausted through the enlarged spaces of the exhaust channels between the touch member 11 and the touch sensitive circuit board 12. Consequently, the tightness of the attachment or the assembly between the touch member 11 and the touch sensitive circuit board 12 is effectively enhanced.

Figure 2:
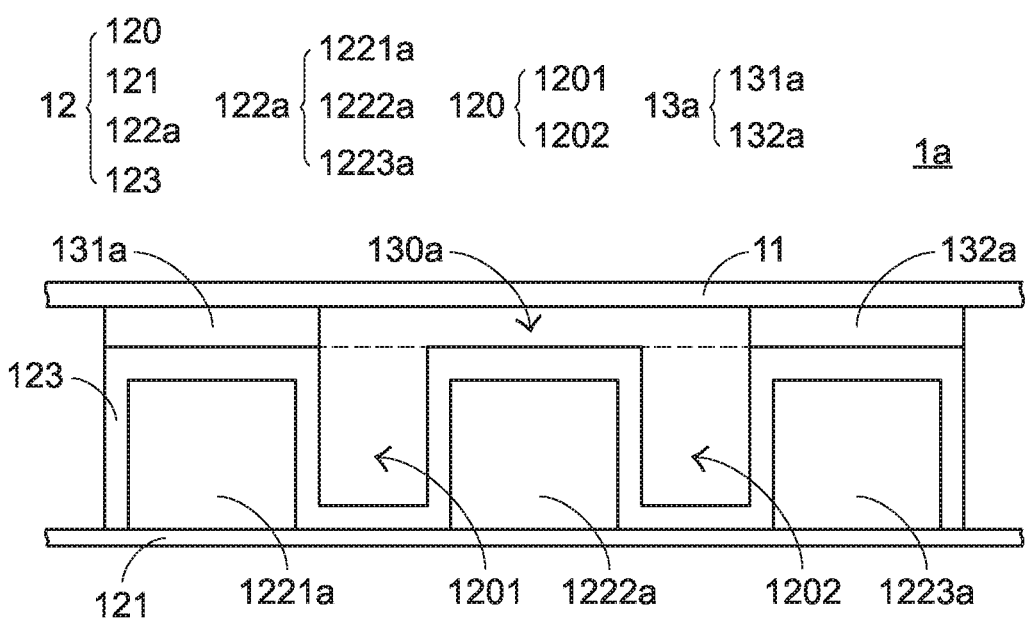
FIG. 2 is a schematic cross-sectional view illustrating a touchpad module according to a second embodiment of the present invention.

FIG. 2 is a schematic cross-sectional view illustrating a touchpad module according to a second embodiment of the present invention. In comparison with the touchpad module shown in FIG. 1, the numbers of the exhaust channels and the additional exhaust channels in the touchpad module 1a of this embodiment are different. For example, in the touchpad module 1a of this embodiment, one additional exhaust channel 130 is in communication with two exhaust channels 120.

As shown in FIG. 2, the sensing wire layer 122a comprises a first sensing wire unit 1221a, a second sensing wire unit 1222a and a third sensing wire unit 1223a. The second sensing wire unit 1222a is arranged between the first sensing wire unit 1221a and the third sensing wire unit 1223a. The first sensing wire unit 1221a, the second sensing wire unit 1222a, the third sensing wire unit 1223a and a portion of the substrate 121 are covered by the solder resist layer 123. Consequently, plural exhaust channels 120 are formed in the solder resist layer 123 and arranged between the first sensing wire unit 1221a, the second sensing wire unit 1222a and the third sensing wire unit 1223a. That is, the first exhaust channel 1201 is arranged between the first sensing wire unit 1221a and the second sensing wire unit 1222a, and the second exhaust channel 1202 is arranged between the second sensing wire unit 1222a and the third sensing wire unit 1223a.

As shown in FIG. 2, the additional solder resist layer 13a comprises a first solder resist part 131a and a second solder resist part 132a. The first solder resist part 131a and the second solder resist part 132a are respectively aligned with the first sensing wire unit 1221a and the third sensing wire unit 1223a. In addition, the solder resist layer 123 of the touch sensitive circuit board 12 is covered by the first solder resist part 131a and the second solder resist part 132a. Consequently, an additional exhaust channel 130a is defined between the first solder resist part 131a and the second solder resist part 132a. In this embodiment, the additional exhaust channel 130 formed in the additional solder resist layer 13a and the first exhaust channel 1201 and the second exhaust channel 1202 formed in the solder resist layer 123 are in communication with each other.

As shown in FIG. 2, the first solder resist part 131a is directly located over a first portion of the solder resist layer 123 aligned with the first sensing wire unit 1221a, and the second solder resist part 132a is directly located over a second portion of the solder resist layer 123 aligned with the third sensing wire unit 1223a. When the additional solder resist layer 13a is formed to cover the solder resist layer 123 of the touch sensitive circuit board 12, the first exhaust channel 1201 and the second exhaust channel 1202 of the touch sensitive circuit board 12 are exposed to the additional solder resist layer 13a. In other words, the first exhaust channel 1201 and the second exhaust channel 1202 are aligned with the additional exhaust channel 130a between the first solder resist part 131a and the second solder resist part 132a.

In the above embodiment, the sensing wire layer 122a comprises three sensing wire units, and the additional solder resist layer 13a comprises two solder resist parts. In some other embodiments, the sensing wire layer 122 comprises more than three sensing wire units. After the solder resist layer 123 covers the sensing wire units and a portion of the substrate 121, one exhaust channel 120 is formed in the solder resist layer 123 and arranged between every two adjacent sensing wire units. In other words, the sensing wire layer 122 comprises more than two exhaust channels 120. In case that the sensing wire layer 122 comprises plural sensing wire units, the additional solder resist layer 13a comprises plural solder resist parts. Moreover, every two solder resist parts correspond to three sensing wire units. Consequently, every additional exhaust channel 130a formed in the additional solder resist layer 13a is aligned with two exhaust channels 120.

Figure 3:
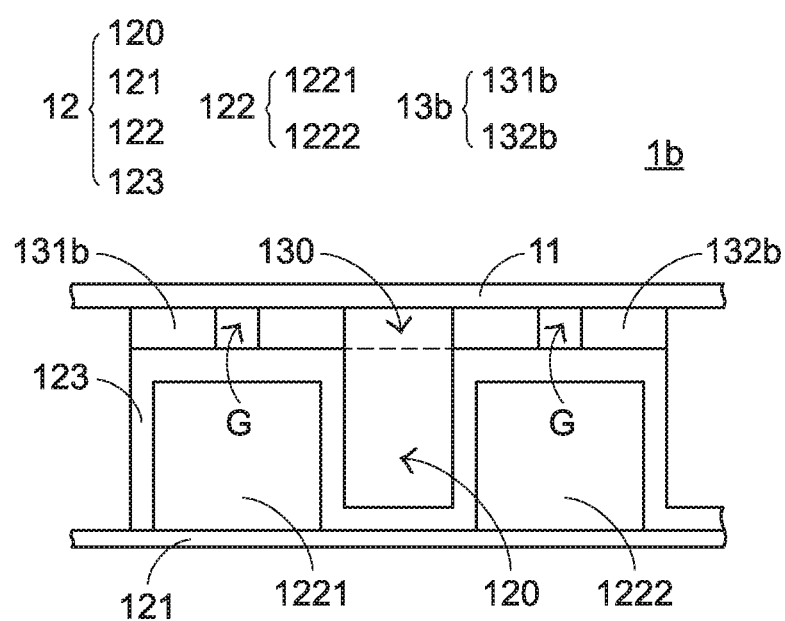
FIG. 3 is a schematic cross-sectional view illustrating a touchpad module according to a third embodiment of the present invention.
Figure 4:
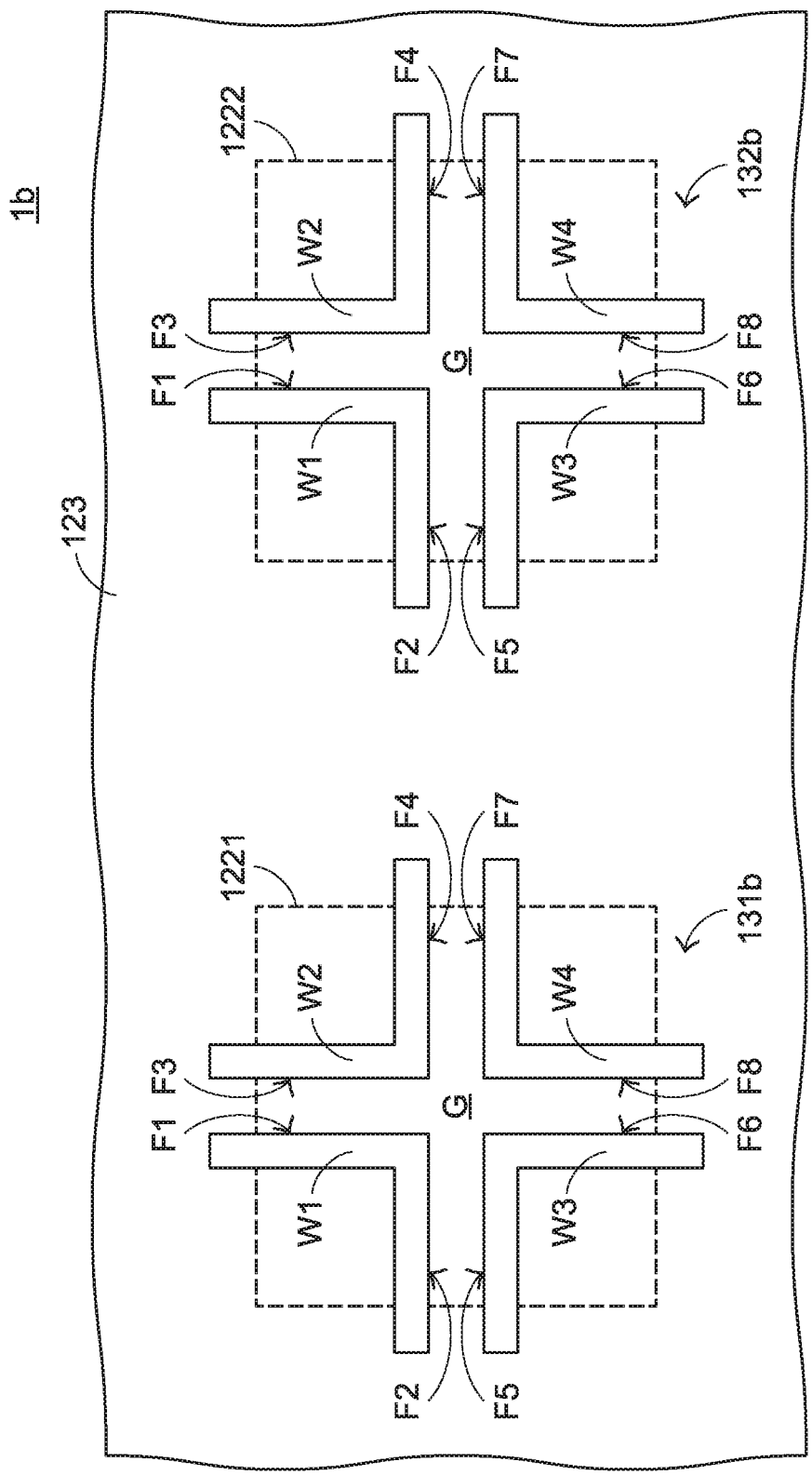
FIG. 4 is a schematic top view illustrating the touchpad module as shown in FIG. 3, in which the touch member is not shown.

Please refer to FIGS. 3 and 4. FIG. 3 is a schematic cross-sectional view illustrating a touchpad module according to a third embodiment of the present invention. FIG. 4 is a schematic top view illustrating the touchpad module as shown in FIG. 3. For succinctness, the touch member 11 shown in FIG. 3 is omitted in FIG. 4. In comparison with the touchpad module shown in FIG. 1, a first solder resist part 131b and a second solder resist part 132b of an additional solder resist layer 13b in the touchpad module 1b of this embodiment are patterned structures.

As shown in FIGS. 3 and 4, the additional solder resist layer 13b comprises the first solder resist part 131b and the second solder resist part 132b. The first solder resist part 131b and the second solder resist part 132b are respectively aligned with the first sensing wire unit 1221 and the second sensing wire unit 1222. In addition, the solder resist layer 123 of the touch sensitive circuit board 12 is covered by the first solder resist part 131b and the second solder resist part 132b. Consequently, an additional exhaust channel 130 is defined between the first solder resist part 131 and the second solder resist part 132. In this embodiment, each of the first solder resist part 131b and the second solder resist part 132b comprises a gas channel G. The gas channel G of the first solder resist part 131b and the gas channel G of the second solder resist part 132b are in communication with the additional exhaust channel 130.

As mentioned above, the additional exhaust channel 130 arranged between the first solder resist part 131b and the second solder resist part 132b and the original exhaust channel 120 of the touch sensitive circuit board 12 are in communication with each other. Moreover, in this embodiment, the gas channel G of the first solder resist part 131b and the gas channel G of the second solder resist part 132b are in communication with the additional exhaust channel 130. Due to this structural design, the space of the overall exhaust channel of the touchpad module 1b is largely increased.

Please refer to FIG. 4 again. In this embodiment, each of the first solder resist part 131b and the second solder resist part 132b is a patterned structure comprising four bent walls, i.e., a first bent wall W1, a second bent wall W2, a third bent wall W3 and a fourth ben wall W4. The first bent wall W1 has a first surface F1 and a second surface F2, which are perpendicular to each other. The second bent wall W2 has a third surface F3 and a fourth surface F4, which are perpendicular to each other. The third bent wall W3 has a fifth surface F5 and a sixth surface F6, which are perpendicular to each other. The fourth bent wall W4 has a seventh surface F7 and an eighth surface F8, which are perpendicular to each other. The first surface F1 of the first bent wall W1 and the third surface F3 of the second bent wall W2 are opposed to each other. The second surface F2 of the first bent wall W1 and the fifth surface F5 of the third bent wall W3 are opposed to each other. The fourth surface F4 of the second bent wall W2 and the seventh surface F7 of the fourth bent wall W4 are opposed to each other. The sixth surface F6 of the third bent wall W1 and the eighth surface F8 of the fourth bent wall W4 are opposed to each other. A cross-shaped gas channel G is defined by the first surface F1, the second surface F2, the third surface F3, the fourth surface F4, the fifth surface F5, the sixth surface F6, the seventh surface F7 and the eighth surface F8 collaboratively.

In the above embodiment, each of the first solder resist part 131b and the second solder resist part 132b is a patterned structure comprising four bent walls. It is noted that the shapes of the patterned structures of the first solder resist part 131b and the second solder resist part 132b are not restricted. That is, the shapes of the patterned structures of the first solder resist part 131b and the second solder resist part 132b may be varied according to the practical requirements.

From the above descriptions, the present invention provides the touchpad module. The touchpad module is equipped with the additional solder resist layer between the touch member and the touch sensitive circuit board. The additional exhaust channel formed in the additional solder resist layer and the exhaust channel formed in the touch sensitive circuit board are in communication with each other. Consequently, the space of the overall exhaust channel of the touchpad module is increased. Due to this structural design, the following benefits are achieved. For example, while the touch member is attached or assembled on the touch sensitive circuit board, the gas can be exhausted through the enlarged spaces of the exhaust channels between the touch member and the touch sensitive circuit board. Consequently, the tightness of the attachment or the assembly between the touch member and the touch sensitive circuit board is effectively enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module, comprising:
   a touch member;
   a touch sensitive circuit board located under the touch member, and comprising a substrate, a sensing wire layer and a solder resist layer, wherein the sensing wire layer is installed on the substrate, the sensing wire layer and a portion of the substrate are covered by the solder resist layer, and at least one exhaust channel is formed in the solder resist layer; and
   an additional solder resist layer arranged between the touch member and the touch sensitive circuit board, wherein at least one additional exhaust channel is formed in the additional solder resist layer and arranged between the touch member and the touch sensitive circuit board, and the at least one additional exhaust channel is in communication with the at least one exhaust channel.

2. The touchpad module according to claim 1, wherein the sensing wire layer comprises a first sensing wire unit and a second sensing wire unit, wherein the first sensing wire unit, the second sensing wire unit and the portion of the substrate are covered by the solder resist layer, and the at least one exhaust channel is formed in the solder resist layer and arranged between the first sensing wire unit and the second sensing wire unit.

3. The touchpad module according to claim 2, wherein the additional solder resist layer comprises a first solder resist part and a second solder resist part, wherein the first solder resist part and the second solder resist part are respectively aligned with the first sensing wire unit and the second sensing wire unit, the solder resist layer of the touch sensitive circuit board is covered by the first solder resist part and the second solder resist part, and the at least one additional exhaust channel is formed between the first solder resist part and the second solder resist part.

4. The touchpad module according to claim 3, wherein each of the first solder resist part and the second solder resist part is a patterned structure, and the patterned structure comprises a gas channel, wherein the gas channel is in communication with the at least one additional exhaust channel.

5. The touchpad module according to claim 1, wherein the sensing wire layer comprises a first sensing wire unit, a second sensing wire unit and a third sensing wire unit, the at least one exhaust channel includes plural exhaust channels, the second sensing wire unit is arranged between the first sensing wire unit and the third sensing wire unit, and the plural exhaust channels includes a first exhaust channel and a second exhaust channel, wherein the first sensing wire unit, the second sensing wire unit, the third sensing wire unit and the portion of the substrate are covered by the solder resist layer, the first exhaust channel is arranged between the first sensing wire unit and the second sensing wire unit, the second exhaust channel is arranged between the second sensing wire unit and the third sensing wire unit, and the first exhaust channel and the second exhaust channel are in communication with the at least one additional exhaust channel.

6. The touchpad module according to claim 5, wherein the additional solder resist layer comprises a first solder resist part and a second solder resist part, wherein the first solder resist part and the second solder resist part are respectively aligned with the first sensing wire unit and the third sensing wire unit, the solder resist layer of the touch sensitive circuit board is covered by the first solder resist part and the second solder resist part, and the additional exhaust channel is formed between the first solder resist part and the second solder resist part.

7. The touchpad module according to claim 1, wherein the touch member is a glass plate or a thin film.

* * * * *